(12) United States Patent
Boswell et al.

(10) Patent No.: US 11,457,617 B1
(45) Date of Patent: Oct. 4, 2022

(54) FISHING LINE CLEANER

(71) Applicants: Boyd Boswell, Houston, TX (US); Leon Boswell, Houston, TX (US)

(72) Inventors: Boyd Boswell, Houston, TX (US); Leon Boswell, Houston, TX (US)

( * ) Notice: Subject to any disclaimer, the term of this patent is extended or adjusted under 35 U.S.C. 154(b) by 52 days.

(21) Appl. No.: 17/027,812

(22) Filed: Sep. 22, 2020

(51) Int. Cl.
*A01K 87/00* (2006.01)
*A01K 87/04* (2006.01)
*A01K 97/00* (2006.01)
*A01K 99/00* (2006.01)

(52) U.S. Cl.
CPC .......... *A01K 87/007* (2013.01); *A01K 87/04* (2013.01); *A01K 97/00* (2013.01); *A01K 99/00* (2013.01)

(58) Field of Classification Search
CPC ...... A01K 87/007; A01K 87/04; A01K 97/00; A01K 99/00
USPC .......................................................... 43/4, 25
See application file for complete search history.

(56) References Cited

U.S. PATENT DOCUMENTS

| | | | | |
|---|---|---|---|---|
| 173,534 A * | 2/1876 | Endicott | ........... | A01K 87/00 43/25 |
| 1,627,514 A * | 5/1927 | Kraemer | ........... | A01K 97/16 43/25 |
| 1,709,436 A * | 4/1929 | Koester | ........... | A01K 97/16 43/25 |
| 2,233,311 A * | 2/1941 | Harne | ........... | A01K 97/16 43/25 |
| 2,237,761 A * | 4/1941 | Leano | ........... | A47L 21/00 15/160 |
| 2,517,089 A * | 8/1950 | Dean | ........... | A01K 97/16 118/DIG. 22 |
| 2,683,274 A * | 7/1954 | Kappes | ........... | H02G 1/1285 15/160 |
| 2,878,610 A * | 3/1959 | Herstedt | ........... | A01K 87/00 D22/199 |
| 3,545,119 A * | 12/1970 | Murnan | ........... | A01K 87/04 43/25 |
| 3,581,424 A * | 6/1971 | Bloom | ........... | A01K 97/00 43/25 |
| 3,581,428 A * | 6/1971 | Helder | ........... | A01K 87/00 43/25 |
| 3,846,930 A * | 11/1974 | Brown | ........... | A01K 87/04 43/25 |
| 3,927,488 A * | 12/1975 | Peddy | ........... | A01K 91/06 43/25 |
| 4,457,095 A * | 7/1984 | Stevenson | ........... | A01K 97/00 24/16 PB |
| 4,730,409 A * | 3/1988 | Mitchell | ........... | A01K 97/00 30/296.1 |

(Continued)

FOREIGN PATENT DOCUMENTS

WO 2017048838 3/2017

*Primary Examiner* — Timothy D Collins
*Assistant Examiner* — Nicholas Leo Seneczko
(74) *Attorney, Agent, or Firm* — Kyle A. Fletcher, Esq.

(57) ABSTRACT

The fishing line cleaner comprises a clip and a brush. The clip may removably couple to a fishing rod between a reel and a line guide. A fishing line may pass through the brush such that debris is swept from the fishing line as the fishing line is reeled onto the reel. As non-limiting examples, the debris may comprise aquatic plants and algae. The fishing line may be removed from the brush and the clip may be rotated around the fishing rod or repositioned along the fishing rod to reduce friction on the fishing line for casting.

14 Claims, 3 Drawing Sheets

(56) References Cited

U.S. PATENT DOCUMENTS

| | | | | | |
|---|---|---|---|---|---|
| 5,249,389 | A | * | 10/1993 | Gallo | A01H 1/027 47/1.41 |
| 5,704,088 | A | * | 1/1998 | Cerroni | B08B 1/00 15/160 |
| 6,282,830 | B1 | * | 9/2001 | Henry | A01K 91/065 43/4.5 |
| 6,418,658 | B1 | * | 7/2002 | Knickrehm | A01K 87/00 43/25 |
| 8,474,176 | B2 | * | 7/2013 | Shelton | A45D 24/30 43/132.1 |
| D690,890 | S | * | 10/2013 | Matthews | D32/35 |
| 9,532,556 | B2 | * | 1/2017 | Farrington | A01K 87/007 |
| 10,306,876 | B2 | * | 6/2019 | Jaramus | B25F 1/04 |
| D858,109 | S | * | 9/2019 | Crawford | D4/130 |
| 2017/0071182 | A1 | * | 3/2017 | Larson | A01K 97/16 |
| 2017/0332616 | A1 | * | 11/2017 | Cochran | A01K 91/04 |
| 2017/0367309 | A1 | * | 12/2017 | Morris | A01K 87/08 |
| 2019/0357510 | A1 | * | 11/2019 | Martin | A01K 87/008 |

* cited by examiner

FISHING LINE CLEANER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of fishing equipment, more specifically, a fishing line cleaner.

SUMMARY OF INVENTION

The fishing line cleaner comprises a clip and a brush. The clip may removably couple to a fishing rod between a reel and a line guide. A fishing line may pass through the brush such that debris is swept from the fishing line as the fishing line is reeled onto the reel. As non-limiting examples, the debris may comprise aquatic plants and algae. The fishing line may be removed from the brush and the clip may be rotated around the fishing rod or repositioned along the fishing rod to reduce friction on the fishing line for casting.

An object of the invention is to clean a fishing line.

Another object of the invention is to provide a clip for removably coupling the invention to a fishing rod.

A further object of the invention is to provide a brush for removing debris from the fishing line as the fishing line passed through the brush.

Yet another object of the invention is to provide a split brush comprising a left brush half and a right brush half each comprising bristles that are oriented tangentially to the fishing rod.

These together with additional objects, features and advantages of the fishing line cleaner will be readily apparent to those of ordinary skill in the art upon reading the following detailed description of the presently preferred, but nonetheless illustrative, embodiments when taken in conjunction with the accompanying drawings.

In this respect, before explaining the current embodiments of the fishing line cleaner in detail, it is to be understood that the fishing line cleaner is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the fishing line cleaner.

It is therefore important that the claims be regarded as including such equivalent construction insofar as they do not depart from the spirit and scope of the fishing line cleaner. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
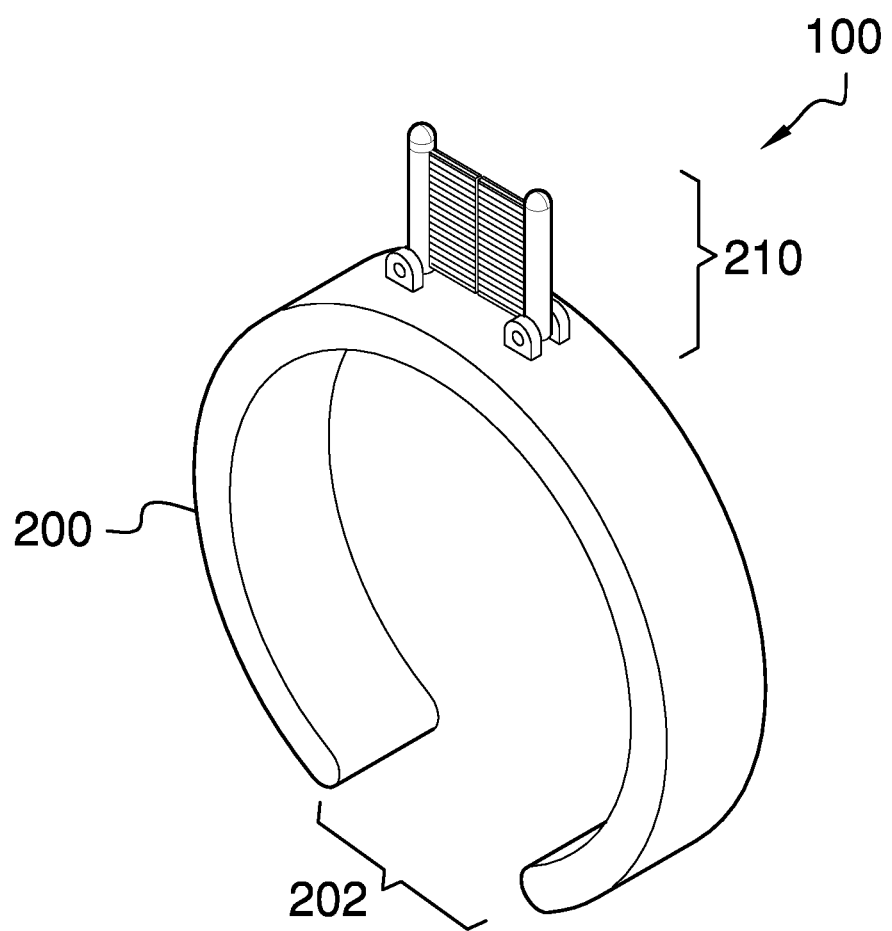
FIG. 1 is an isometric view of an embodiment of the disclosure.
Figure 2:
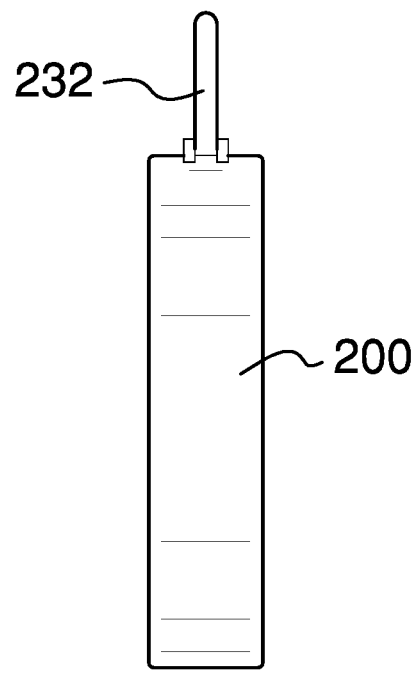
FIG. 2 is a side view of an embodiment of the disclosure.
Figure 3:
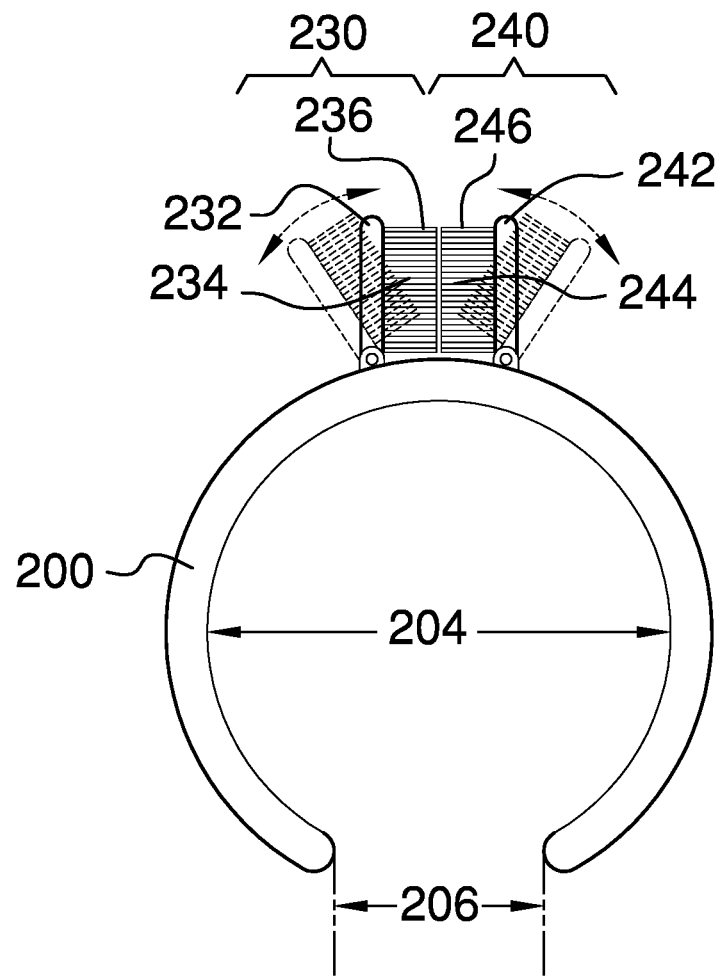
FIG. 3 is a front view of an embodiment of the disclosure.
Figure 4:
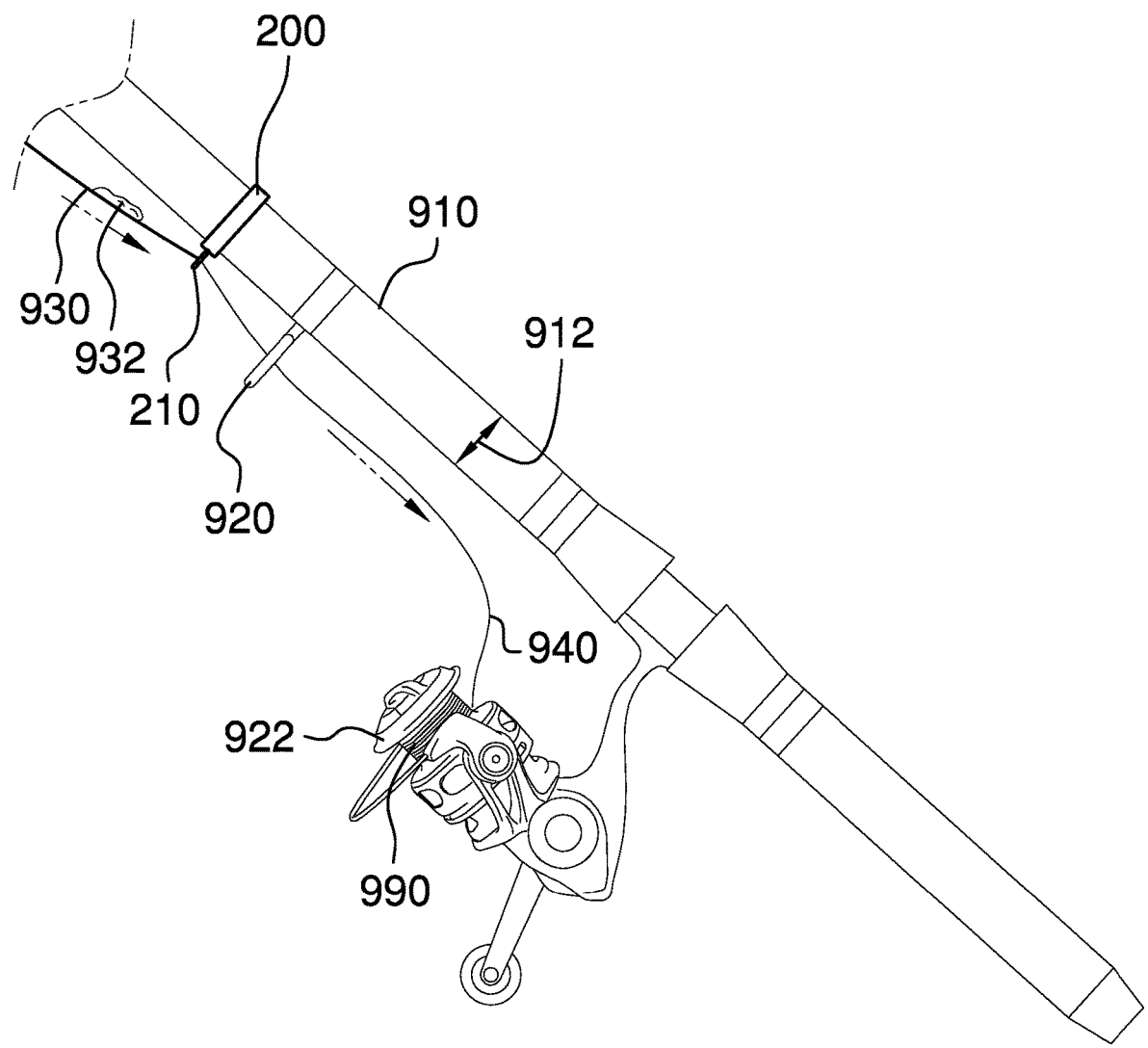
FIG. 4 is an in-use view of an embodiment of the disclosure.

Detailed reference will now be made to a first potential embodiment of the disclosure, which is illustrated in FIGS. 1 through 4.

The fishing line cleaner 100 (hereinafter invention) comprises a clip 200 and a brush 210. The clip 200 may removably couple to a fishing rod 910 between a reel 922 and a line guide 920. A fishing line 900 may pass through the brush 210 such that debris 932 is swept from the fishing line 900 as the fishing line 900 is reeled onto the reel 922. As non-limiting examples, the debris 932 may comprise aquatic plants and algae. The fishing line 900 may be removed from the brush 210 and the clip 200 may be rotated around the fishing rod 910 or repositioned along the fishing rod 910 to reduce friction on the fishing line 900 for casting.

The clip 200 may be a split ring comprising a radial gap 202. An inside diameter of the clip 204 may be less than or equal to an outside diameter of the rod 912. A width of the gap 206 may be less than the inside diameter of the clip 204.

In some embodiments, the clip 200 may be made from a semi-rigid material. The clip 200 may flex such that the radial gap 202 may be opened to a distance of at least the outside diameter of the rod 912. The clip 200 may be installed on the fishing rod 910 by flexing the clip 200 open, passing the fishing rod 910 through the radial gap 202, and releasing the clip 200 to spring back and grasp the fishing rod 910.

In some embodiments, the clip 200 may be made from a rigid or semi-rigid material. The width of the gap 206 may be wider than the width of any of the line guides 920. Taking advantage of the fact that the fishing rod 910 is tapered and is narrower at tiptop of the fishing rod 910, the clip 200 may be installed by positioning the clip 200 at a tip top of the fishing rod 910 with the radial gap 202 aligned with the line guides 920 and passing the clip 200 over the length of the fishing rod 910 with the line guides 920 passing through the radial gap 202 one-by-one until the clip 200 is positioned between the reel 922 and the line guide 920 closest to the reel 922. Friction between the fishing rod 910 and the clip 200 may hold the clip 200 in place.

The brush 210 may be located on the clip 200 at a position opposite the radial gap 202. The brush 210 may be oriented such that the brush 210 is located on the outside of the clip 200. The brush 210 may comprise a plurality of bristles. A dirty line 930 may pass through the plurality of bristles to remove the debris 932 such that a clean line 940 may emerge from the brush 210 to be wound on the reel 922.

In some embodiments, the brush 210 may be divided into a left brush half 230 and a right brush half 240. The left brush half 230 may comprise a left post 232 and a left plurality of bristles 234. The right brush half 240 may comprise a right post 242 and a right plurality of bristles 244. The left post 232 may project away from the clip 200 parallel to the right post 242. One end of the left plurality of bristles 234 may be coupled to the left post 232. The left plurality of bristles 234 may be oriented to be parallel to each other. The left plurality of bristles 234 may be oriented to be perpendicular to the left post 232. The left post 232 may hold the left plurality of bristles 234 in a tangential orientation relative to the clip 200. One end of the right plurality of bristles 244 may be coupled to the right post 242. The right plurality of bristles 244 may be oriented to be parallel to each other. The right plurality of bristles 244 may be oriented to be perpendicular to the right post 242. The right post 242 may hold the right plurality of bristles 244 in a tangential orientation relative to the clip 200. The left plurality of bristles 234 may be oriented to be parallel to the right plurality of bristles 244.

In some embodiments, the lengths of the left plurality of bristles 234 and the right plurality of bristles 244 may be one half of the distance between the left post 232 and the right post 242 such that left tips 236 of the left plurality of bristles 234 may separably contact right tips 246 of the right plurality of bristles 244. In some embodiments, the lengths of the left plurality of bristles 234 and the right plurality of bristles 244 may be greater than one half of the distance between the left post 232 and the right post 242 such that the left plurality of bristles 234 overlap the right plurality of bristles 244.

It may generally be desirable to disengage the fishing line 900 from the brush 210 while casting because friction between the brush 210 and the fishing line 900 may decrease the distance of the cast. Once the fishing line 900 is disengaged, the clip 200 may be moved to prevent the fishing line 900 from engaging the brush 210 again. The fishing line 900 may be disengaged from the brush 210 by pulling the fishing line 900 through the plurality of bristles until the fishing line 900 is free of the plurality of bristles. The clip 200 may be rotated around the fishing rod 910 such that the brush 210 is not in the path of the fishing line 900 to prevent the brush 210 from engaging the fishing line 900. Alternatively, the clip 200 may slide further onto the fishing rod 910 such that the brush 210 is not in the path of the fishing line 900 to prevent the brush 210 from engaging the fishing line 900.

In use, the clip 200 is placed onto the fishing rod 910—either by springing the clip 200 open at the radial gap 202 and passing the fishing rod 910 through the radial gap 202 or by placing the clip 200 at the tip top of the fishing rod 910, aligning the radial gap 202 with the line guides 920, and sliding the clip 200 onto the fishing rod 910. The clip 200 may be placed on the fishing rod 910 between the reel 922 and the line guide 920 that is closest to the reel 922 with the brush 210 aligned with the fishing line 900. While casting, the fishing line 900 may be disengaged from the brush 210 and the clip 200 may be repositioned to prevent the fishing line 900 from engaging with the brush 210. After casting, the clip 200 may be moved back to the position where the fishing line 900 may be pressed into the plurality of bristles and will be retained by the plurality of bristles. The fishing line 900 may become fouled while submerged. The dirty line 930 being reeled back into the reel 922 may pass into the brush 210 and the debris 932 may be removed by the plurality of bristles. The clean line 940 emerging from the brush 210 may be wound onto the reel 922.

Definitions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" may refer to top and "lower" may refer to the bottom. As a non-limiting example, the upper end of a vertical shaft is the top end of the vertical shaft.

As used herein, the words "couple", "couples", "coupled" or "coupling", may refer to connecting, either directly or indirectly, and does not necessarily imply a mechanical connection.

As used in this disclosure, a "diameter" of an object is a straight line segment that passes through the center (or center axis) of an object. The line segment of the diameter is terminated at the perimeter or boundary of the object through which the line segment of the diameter runs.

As used herein, "fishing line" may refer to a monofilament cord to which a hook or lure is attached for the purpose of capturing a fish.

As used in this disclosure, a "fishing rod" may be a tapered shaft to which a fishing line is attached. A fishing rod may have a fishing reel attached to the rod in order to retrieve the fishing line after the line has been cast.

As used herein, "inside diameter" or "inner diameter" may refer to a measurement made on a hollow object. Specifically, the inside diameter is the distance from one inside wall to the opposite inside wall. If the object is round, then the inside diameter is a true diameter, however the term may also be used in connection with a square object in which case the inside diameter is simply the narrowest inside measurement that passes through the center of the object.

As used in this disclosure, "orientation" may refer to the positioning and/or angular alignment of a first object relative to a second object or relative to a reference position or reference direction.

As used herein, "outside diameter" or "outer diameter" may refer to a measurement made on an object. Specifically, the outside diameter is the distance from one point on the outside of the object to a point on the opposite side of the object along a line passing through the center of the object. The term outside diameter is frequently used in conjunction with round objects such as hollow conduits in which case the outside diameter is a true diameter, however the term may also be used in connection with a square object in which case the outside diameter is simply the widest outside measurement that passes through the center of the conduit.

As used in this disclosure, the term "radial" may refer to a direction which is perpendicular to an identified central axis or which projects away from a center point.

As used herein, "resilient" or "semi-rigid" may refer to an object or material which will deform when a force is applied to it and which will return to its original shape when the deforming force is removed.

As used herein, "rigid" may refer to an object or material which is inflexible. A rigid object may break if force is applied to the object.

As used herein, "taper" may refer to a continuous and typically, but not necessarily, gradual change in the span of a one or more dimensions of an elongated object that occurs in the apparent direction of elongation. An object that narrows along an axis may be called tapered.

As used herein, "tip top" may refer to the topmost (farthest away from the handle) line guide of a fishing rod.

With respect to the above description, it is to be realized that the optimum dimensional relationship for the various components of the invention described above and in FIGS. 1 through 4, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A fishing line cleaner comprising:
a clip and a brush;
wherein the clip removably couples to a fishing rod between a reel and a line guide;
wherein a fishing line passes through the brush such that debris is swept from the fishing line as the fishing line is reeled onto the reel;
wherein the clip is a split ring comprising a radial gap;
wherein the clip is made from a rigid or semi-rigid material;
wherein the width of the gap is wider than the width of any of the line guides;
wherein the clip is installed by positioning the clip at a tip top of the fishing rod with the radial gap aligned with the line guides and passing the clip over the length of the fishing rod with the line guides passing through the radial gap one-by-one until the clip is positioned between the reel and the line guide closest to the reel;
wherein friction between the fishing rod and the clip holds the clip in place;
wherein the brush is located on the clip at a position opposite the radial gap;
wherein the brush is oriented such that the brush is located on the outside of the clip;
wherein the brush comprises a plurality of bristles;
wherein a dirty line passes through the plurality of bristles to remove the debris such that a clean line emerges from the brush to be wound on the reel.

2. The fishing line cleaner according to claim 1 wherein an inside diameter of the clip is less than or equal to an outside diameter of the rod.

3. The fishing line cleaner according to claim 2 wherein a width of the gap is less than the inside diameter of the clip.

4. The fishing line cleaner according to claim 3 wherein the clip is made from a semi-rigid material;
wherein the clip flexes such that the radial gap is opened to a distance of at least the outside diameter of the rod;
wherein the clip is installed on the fishing rod by flexing the clip open, passing the fishing rod through the radial gap, and releasing the clip to spring back and grasp the fishing rod.

5. The fishing line cleaner according to claim 4 wherein the brush is divided into a left brush half and a right brush half;
wherein the left brush half comprises a left post and a left plurality of bristles;
wherein the right brush half comprises a right post and a right plurality of bristles.

6. The fishing line cleaner according to claim 5 wherein the left post projects away from the clip parallel to the right post.

7. The fishing line cleaner according to claim 6 wherein one end of the left plurality of bristles is coupled to the left post;
wherein the left plurality of bristles are oriented to be parallel to each other;
wherein the left plurality of bristles are oriented to be perpendicular to the left post;
wherein the left post holds the left plurality of bristles in a tangential orientation relative to the clip.

8. The fishing line cleaner according to claim 7 wherein one end of the right plurality of bristles is coupled to the right post;
wherein the right plurality of bristles are oriented to be parallel to each other;
wherein the right plurality of bristles are oriented to be perpendicular to the right post;
wherein the right post holds the right plurality of bristles in a tangential orientation relative to the clip.

9. The fishing line cleaner according to claim 8 wherein the left plurality of bristles are oriented to be parallel to the right plurality of bristles.

10. The fishing line cleaner according to claim 9 wherein the lengths of the left plurality of bristles and the right plurality of bristles are one half of the distance between the left post and the right post such that left tips of the left plurality of bristles separably contact right tips of the right plurality of bristles.

11. The fishing line cleaner according to claim 9 wherein the lengths of the left plurality of bristles and the right plurality of bristles are greater than one half of the distance between the left post and the right post such that the left plurality of bristles overlap the right plurality of bristles.

12. The fishing line cleaner according to claim 9 wherein the fishing line is disengaged from the brush by pulling the fishing line through the plurality of bristles until the fishing line is free of the plurality of bristles.

13. The fishing line cleaner according to claim 12 wherein the clip is rotated around the fishing rod such that the brush is not in the path of the fishing line to prevent the brush from engaging the fishing line.

14. The fishing line cleaner according to claim 12 wherein the clip slides further onto the fishing rod such that the brush is not in the path of the fishing line to prevent the brush from engaging the fishing line.

* * * * *